US011707985B2

(12) United States Patent
Malapati et al.

(10) Patent No.: US 11,707,985 B2
(45) Date of Patent: Jul. 25, 2023

(54) STEERING COLUMN INDUCED BREAK AWAY

(71) Applicant: Ford Global Technologies, LLC, Dearborn, MI (US)

(72) Inventors: Srinivas Reddy Malapati, Novi, MI (US); Mangesh Kadam, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 295 days.

(21) Appl. No.: 17/060,887

(22) Filed: Oct. 1, 2020

(65) Prior Publication Data
US 2022/0105806 A1  Apr. 7, 2022

(51) Int. Cl.
*B60K 37/02*  (2006.01)
*B60K 35/00*  (2006.01)
*B62D 1/16*  (2006.01)

(52) U.S. Cl.
CPC .............. *B60K 37/02* (2013.01); *B60K 35/00* (2013.01); *B62D 1/16* (2013.01); *B60K 2370/63* (2019.05); *B60K 2370/688* (2019.05)

(58) Field of Classification Search
CPC .... B60K 37/02; B60K 35/00; B60K 2370/63; B60K 2370/688; B60K 2370/152; B60K 2370/1529; B60K 2370/67; B60K 2370/782; B60K 37/04; B62D 1/16; B60R 21/045; B60R 21/055
See application file for complete search history.

(56) References Cited

U.S. PATENT DOCUMENTS

| 3,709,057 | A | * | 1/1973 | Kitzner | ................. B62D 1/192 74/492 |
| 6,149,196 | A | * | 11/2000 | Guiard | ................. B60K 37/00 296/74 |
| 7,150,488 | B2 | | 12/2006 | Komylo et al. | |
| 8,764,091 | B2 | | 7/2014 | Clark et al. | |
| 8,939,493 | B1 | | 1/2015 | Barthlow et al. | |
| 9,566,928 | B2 | | 2/2017 | Forth et al. | |
| 2008/0053268 | A1 | * | 3/2008 | Matsu | ..................... B62D 1/11 74/552 |

* cited by examiner

*Primary Examiner* — Omeed Alizada
(74) *Attorney, Agent, or Firm* — Frank A. MacKenzie; Bejin Bieneman PLC

(57) ABSTRACT

An assembly includes a steering column and an instrument panel. A bezel is fixed to the instrument panel. A releasable panel is releasably connected to the bezel. A cable extending from the releasable panel to the steering column. In the event of a vehicle impact, the releasable panel releases from the bezel to absorb energy from the steering column.

17 Claims, 4 Drawing Sheets

STEERING COLUMN INDUCED BREAK AWAY

BACKGROUND

A vehicle includes an instrument panel and a steering column supported by the instrument panel vehicle-forward of a driver. The steering column may be designed to deform relative to the instrument panel when impacted by a driver during a vehicle impact. The forward movement of the steering column may absorb energy from the driver and may position the steering column and a steering wheel on the steering column. This positioning of the steering column may also be a design factor in the operation of a driver airbag supported by the steering wheel.

DETAILED DESCRIPTION

Figure 1:
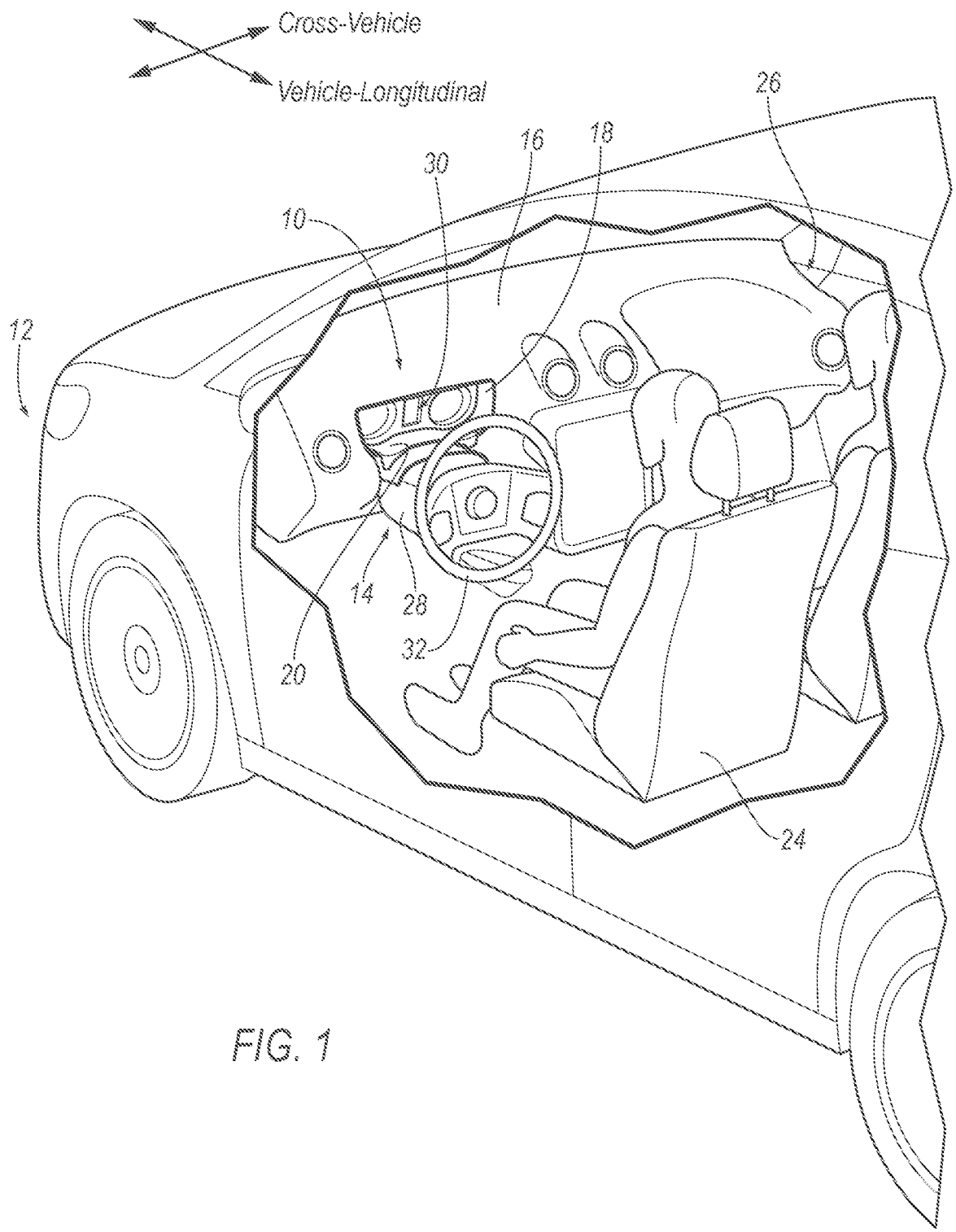
FIG. 1 is a perspective view of a portion of a vehicle including an instrument panel and a steering column positioned vehicle-forward of a driver.

An assembly includes a steering column, an instrument panel, a bezel fixed to the instrument panel, a releasable panel releasably connected to the bezel, and a cable extending from the releasable panel to the steering column.

The assembly may include a first tear seam between the bezel and the releasable panel and a second tear seam between the bezel and the releasable panel, the first tear seam and the second tear seam being spaced from each other. The releasable panel may include a hinge having a rotational axis extending through the first tear seam and the second tear seam, the hinge being between the cable and the bezel. A second hinge may be between the hinge and the bezel. The releasable panel may have a free edge, the hinge being between the free edge and the bezel. The releasable panel may have a class-A surface at the free edge. The hinge may be elongated in a generally cross-vehicle direction and the first tear seam and the second tear seam may be elongated in generally vehicle-longitudinal directions. The releasable panel may be elongated from the first tear seam to the second tear seam.

The assembly may include a tear seam between the releasable panel and the bezel. The tear seam may be designed to break in response to impact of the steering column by an occupant during a frontal vehicle impact.

The assembly may include a gauge cluster supported by the instrument panel, the releasable panel being between the gauge cluster and the steering column. The releasable panel may be below the gauge cluster, the cable may be below the releasable panel, and the steering column may be below the cable. The releasable panel may have a class-A surface facing the gauge cluster.

The cable may be designed to release from at least one of the releasable panel and the steering column when tensile load on the cable exceeds between 225-275N.

With reference to the Figures, where like numerals indicate like elements, an assembly 10 of a vehicle 12 includes a steering column 14 an instrument panel 16 and a bezel 18 fixed to the instrument panel 16. A releasable panel 20 is releasably connected to the bezel 18. A cable 22 extends from the releasable panel 20 to the steering column 14.

In the event of a vehicle-frontal impact in which the steering column 14 is impacted by a vehicle occupant, the releasable panel 20 releases from the bezel 18 to absorb energy and to allow for vehicle-forward stroke of the steering column 14 relative to the instrument panel 16. Specifically, in the event the vehicle-frontal impact urges the driver in a vehicle-forward direction to impart force on the steering column 14 in the vehicle-forward direction, the steering column 14 moves relative to the instrument panel 16 in the vehicle-forward direction. This movement of the steering column 14 pulls the cable 22 and cable 22 pulls the releasable panel 20. In the event the force on the steering column 14 exceeds a design threshold, the releasable panel 20 releases from the bezel 18.

The vehicle 12 may be any suitable type of automobile, e.g., a passenger or commercial automobile such as a sedan, a coupe, a truck, a sport utility, a crossover, a van, a minivan, a taxi, a bus, etc. The vehicle 12 for example, may be autonomous. In other words, the vehicle 12 may be autonomously operated such that the vehicle 12 may be driven without constant attention from a driver, i.e., the vehicle 12 may be self driving without human input.

The vehicle 12 defines a passenger cabin 26 to house occupants, if any, of the vehicle 12. The passenger cabin 26 may extend across the vehicle 12 i.e., from a left side to a right side of the vehicle 12. The passenger cabin 26 includes a front end and a rear end with the front end being in front of the rear end during forward movement of the vehicle 12.

The vehicle 12 includes a plurality of seats including a driver seat 24. The seats, including the driver seat 24, include a seatback and a seat bottom (not numbered). The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other. The seatback may include a seatback frame and a covering supported on the seatback frame. The seatback frame may include tubes, beams, etc. Specifically, the seatback frame includes a pair of upright frame members. The upright frame members are elongated, and specifically, are elongated in a generally upright direction when the seatback is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seatback frame and may be foam or any other suitable material.

The vehicle 12 includes the instrument panel 16. The instrument panel 16 is disposed the front end of the passenger cabin 26. The instrument panel 16 may extend across the front end of the passenger cabin 26 from one side of the vehicle 12 to the other side of the vehicle 12. Specifically, the instrument panel 16 is vehicle-forward of the driver seat 24.

The instrument panel 16 may include a frame (not shown) that is mounted to a body of the vehicle 12 and a covering (not numbered) that faces the passenger cabin 26. The instrument panel 16 may be below a windshield of the vehicle 12. The instrument panel 16 may house heating, ventilation, and air conditioning (HVAC) ducts, wiring, and electronic equipment of the vehicle 12.

The instrument panel 16 may support controls of the vehicle 12, e.g., climate control inputs, audio inputs, gauges, indicators, etc. As an example, the instrument panel 16 may support a gauge cluster 30 that is vehicle-forward relative to a driver-seat 24 of the vehicle 12. The gauge cluster 30 may include gauges for control of the driving of the vehicle 12, e.g., a speedometer, fuel gauge, etc.

The bezel 18 is fixed to the instrument panel 16. The bezel 18 surrounds the gauge cluster 30. The bezel 18 may, for example, provide a transition from an exterior surface of the instrument panel 16 to the gauge cluster 30. The bezel 18 may have a class-A surface, i.e., a finished surface exposed to view by a customer and free of unaesthetic blemishes and defects.

The vehicle 12 includes a steering system. The steering system controls the turning of wheels of the vehicle 12. The steering system may include a rack-and-pinion system with electric power-assisted steering, a steer-by-wire system, as are both known in the art, or any other suitable system.

The steering system of the vehicle 12 includes a steering column 14 and a steering wheel 32 supported by the steering column 14. The steering wheel 32 is in the passenger cabin 26 and the steering column 14 is at least partly in the passenger cabin 26. The steering wheel 32 receives rotational input from an driver, i.e., a driver seated in the driver seat 24, and the steering column 14 transmits the rotation through other components of the steering system to the wheels of the vehicle 12. The vehicle 12 may include a driver airbag supported by the steering wheel 32.

The steering column 14 is adjacent the instrument panel 16 and may be supported by the instrument panel 16. As an example, the steering column 14 may be connected to the frame of the instrument pane, e.g., by an intermediate bracket (not shown). The steering column 14 includes at least one steering shaft 48 (shown in FIGS. 5A-C) that is fixed to the steering wheel 32 to transmit rotation of the steering wheel 32. The steering column 14 includes a shroud 28 that surrounds the steering shaft. The shroud 28 has a class-A surface facing the passenger cabin 26, i.e., a finished surface exposed to view by a customer and free of unaesthetic blemishes and defects.

The steering column 14 may be adjustable. For example, the tilt and the for-aft location of the steering column 14 may be adjusted by the driver. As is known, the adjustment may be manual, e.g., with the use of a lever, or may be automated, e.g., with the use of motors controlled by a human-machine interface.

The steering column 14 may be collapsible relative to the instrument panel 16, as shown in the progression of FIGS. 5-C. Specifically, the steering column 14, and specifically the steering wheel 32 on the steering column 14, may move vehicle-forward relative to the instrument panel 16 when subjected to forces that exceed a threshold, e.g., forces associated with a driver impacting the steering wheel 32 and/or steering column 14 in the event of a vehicle impact. For example, the steering column 14 may deform when impacted by the driver in the event of a vehicle impact that urges the driver into the steering column 14. The steering column 14 may deform in any suitable way, including known ways. For example, shroud 28 and/or the steering shaft(s) may be designed to crush, telescopically retract, etc., when subjected to forces from the driver impacting the steering wheel 32 and/or steering column 14 in the event of a vehicle impact. As another example, in addition to or in the alternative to the crush/telescopic retraction of the steering shaft and/or shroud 28, the steering column 14 may be releasable from the instrument panel 16. For example, one, several, or all connections of the steering column 14 to the instrument panel 16 may break in response to forces that exceed the threshold to release the steering column 14 relative to the instrument panel 16 to allow the steering column 14 to move vehicle-forward relative to the instrument panel 16.

Figure 5A:
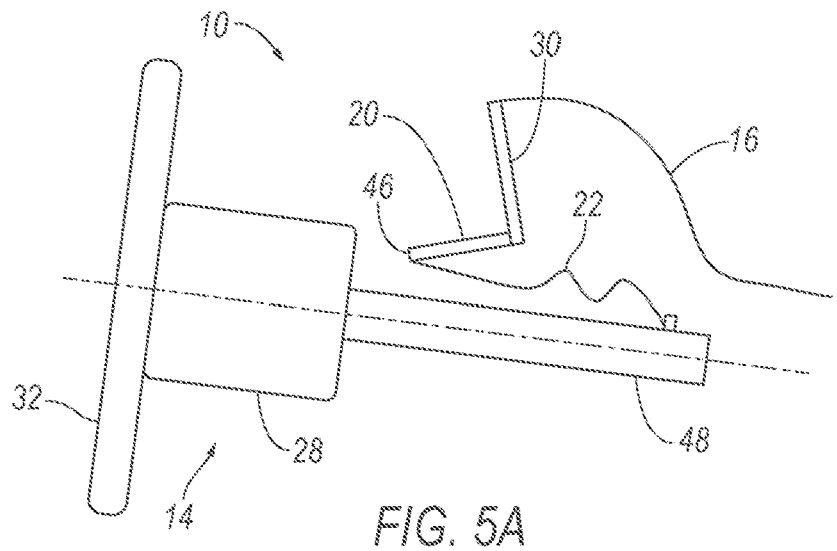
FIG. 5A is a schematic side view of a portion of the instrument panel, the steering column, and the releasable panel prior to impact by a driver during a vehicle impact.
Figure 5B:
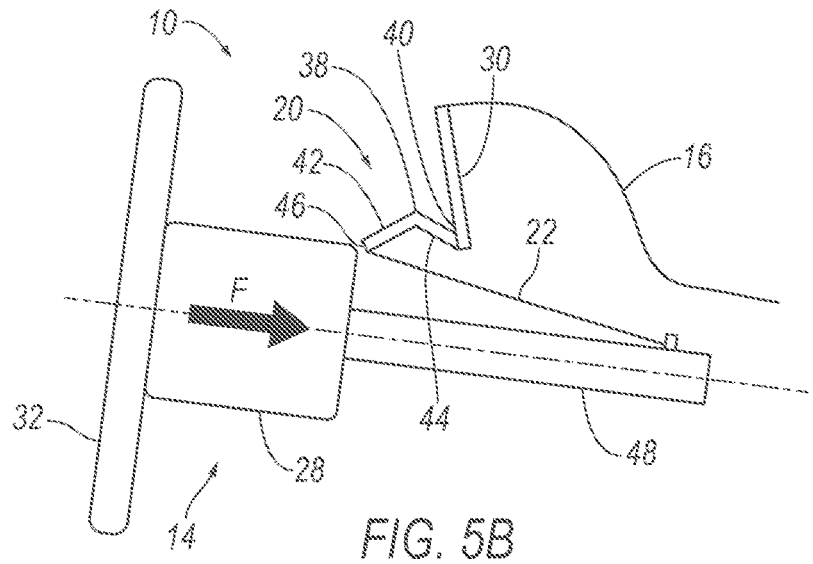
FIG. 5B is the view of FIG. 5A during impact by a driver during a vehicle impact.
Figure 5C:
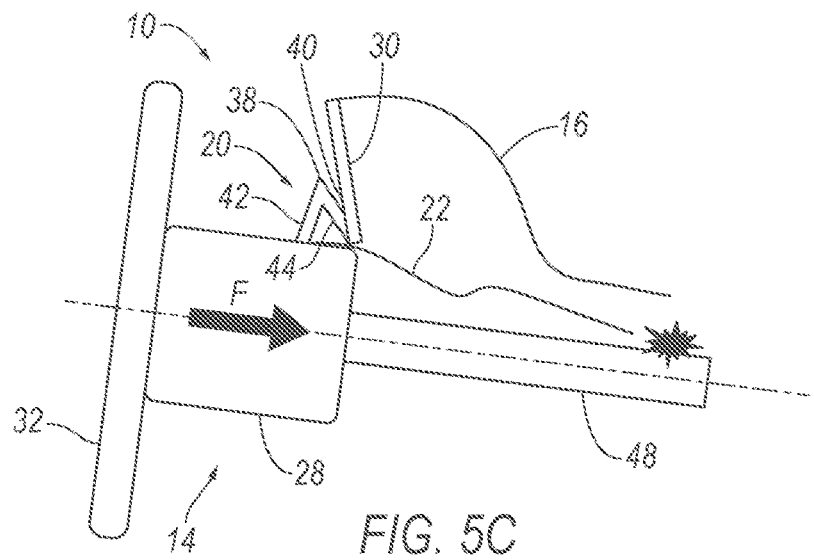
FIG. 5C is a view of FIG. 5B after further movement of the steering column and release of a cable from the steering column.

With reference to FIGS. 5A-C, the cable 22 connects the releasable panel 20 to the steering column 14. Specifically, the cable 22 extends from the releasable panel 20 to the steering column 14. The cable 22 may be, for example, woven metal strands or any other suitable type of material.

The releasable panel 20 is connected to the steering column 14 (e.g., with the cable 22 as described below) and is releasably connected to the bezel 18. In the event the steering column 14 deforms relative to the instrument panel 16, the releasable panel 20 provides a controlled release, e.g., a tear as described further below, from the bezel 18 to absorb energy during movement of the steering column 14 relative to the instrument panel 16.

The releasable panel 20 is connected to the bezel 18. The releasable panel 20 is designed to release from the bezel 18 as the steering column 14 strokes forward when impacted by a vehicle occupant during a vehicle-frontal impact. For example, tear seams 34, 36 may connect the releasable panel 20 to the bezel 18. In such an example, the tear seams 34, 36 release when subjected to force above a threshold resulting is applied to the tear seams 34, 36.

Specifically, with reference FIGS. 2-5C, the tear seams 34, 36 are between the releasable panel 20 and the bezel 18. Any suitable number of tear seams 34, 36, i.e., one or more, may be between the releasable panel 20 and the bezel 18. In the example, shown in the Figures, two tear seams are between the releasable panel 20 and the bezel 18, i.e., a first tear seam 34 and a second tear seam 36. In such an example, the first tear seam 34 and the second tear seam 36 are spaced from each other. Specifically, the first tear seam 34 and the second tear seam 36 are spaced from each other in a cross-vehicle direction. The first tear seam 34 and the second tear seam 36 may be, for example, parallel to each other. The first tear seam 34 and the second tear seam 36 may be elongated in a vehicle-longitudinal direction. The releasable panel 20 may be elongated from the first tear seam 34 to the second tear seam 36.

The tear seams 34, 36 are designed to break in response to impact of the steering column 14 by an occupant during a frontal vehicle impact. The tear seams 34, 36 may be, for example, a line of decreased material thickness and/or perforations to induce tearing along the tear seams 34, 36 when subjected to sufficient force. When the steering column 14 deforms relative to the instrument panel 16 and moves in the vehicle-forward direction relative to the instrument panel 16, the steering column 14 applies force to the releasable panel 20, e.g., through the cable 22, and the first tear seam 34 and second tear seam 36 break away to allow continued vehicle-forward movement of the steering column 14. The releasable panel 20 absorbs energy from the steering column 14, i.e., provides resistance to forward movement of the steering column 14.

Figure 2:
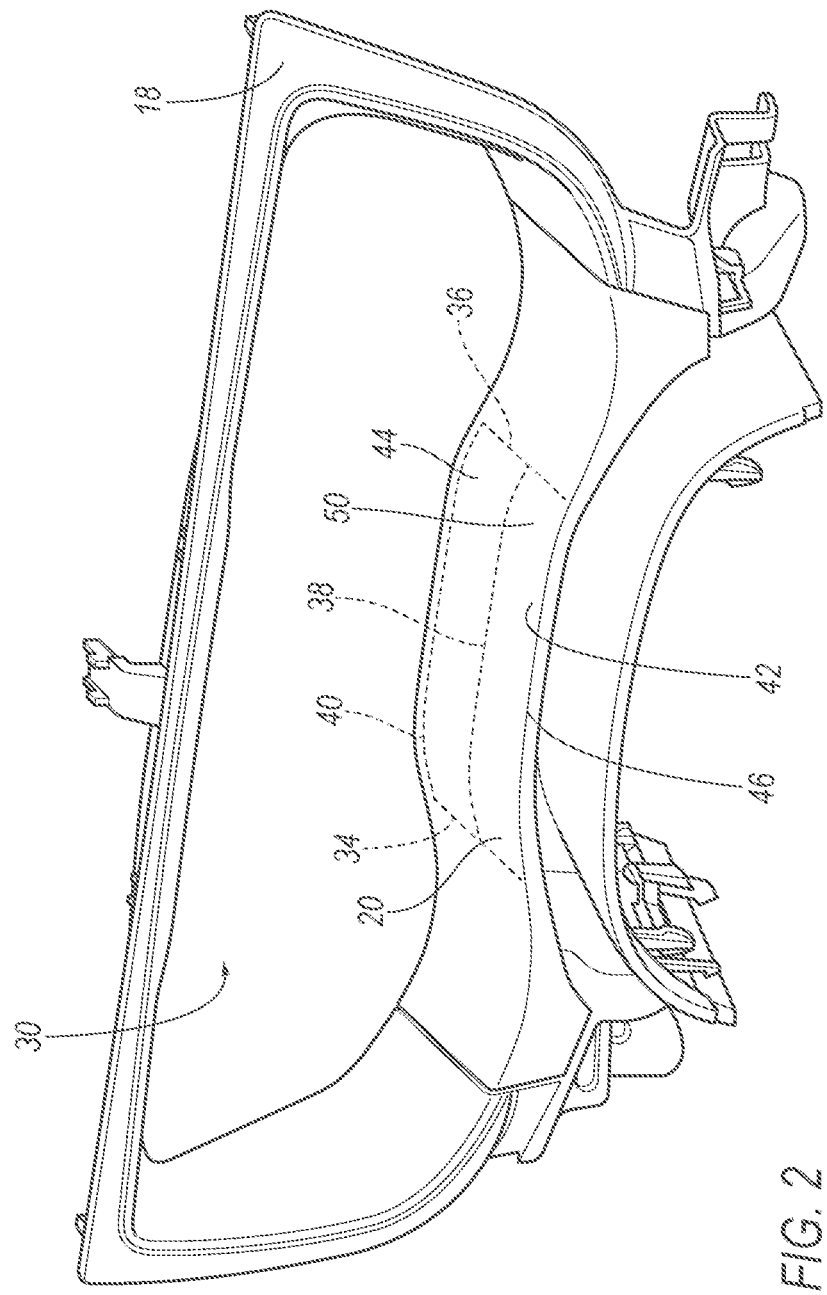
FIG. 2 is a perspective view of a bezel of the instrument panel and a releasable panel connected to the bezel.
Figure 3:
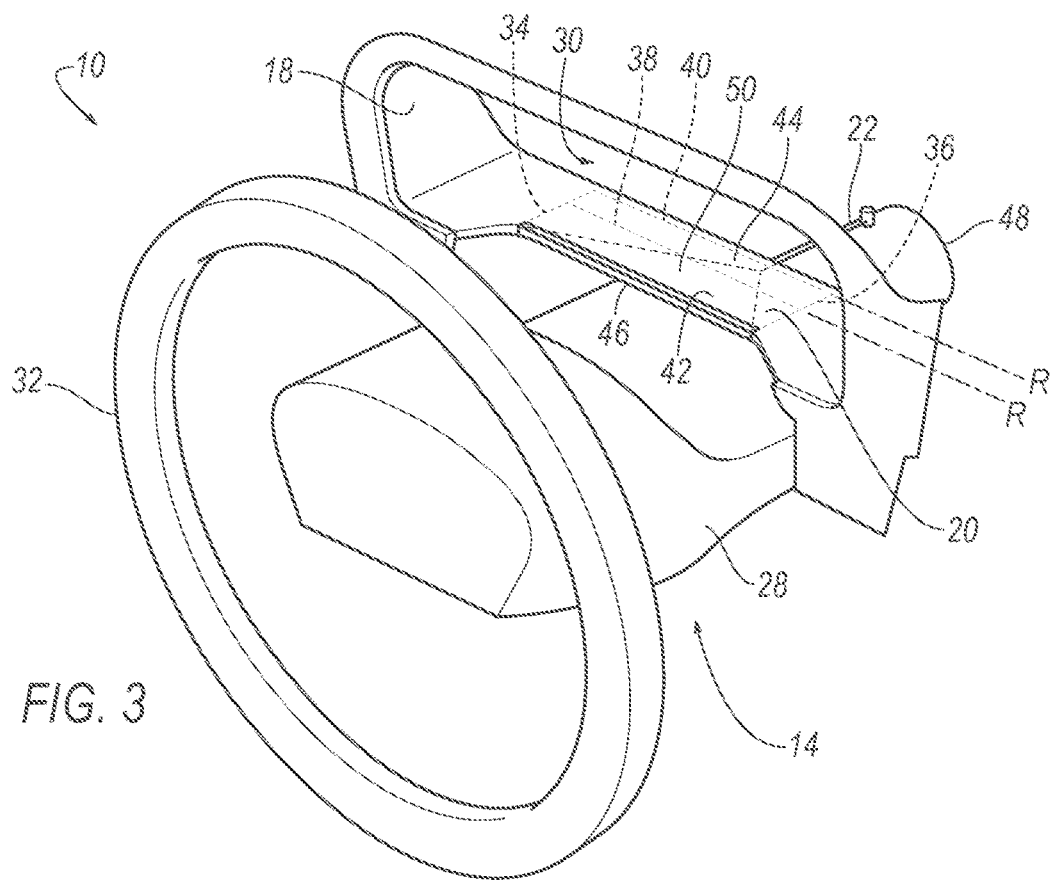
FIG. 3 is a perspective view of a portion of the instrument panel and the steering column prior to impact by a driver during a vehicle impact.
Figure 4:
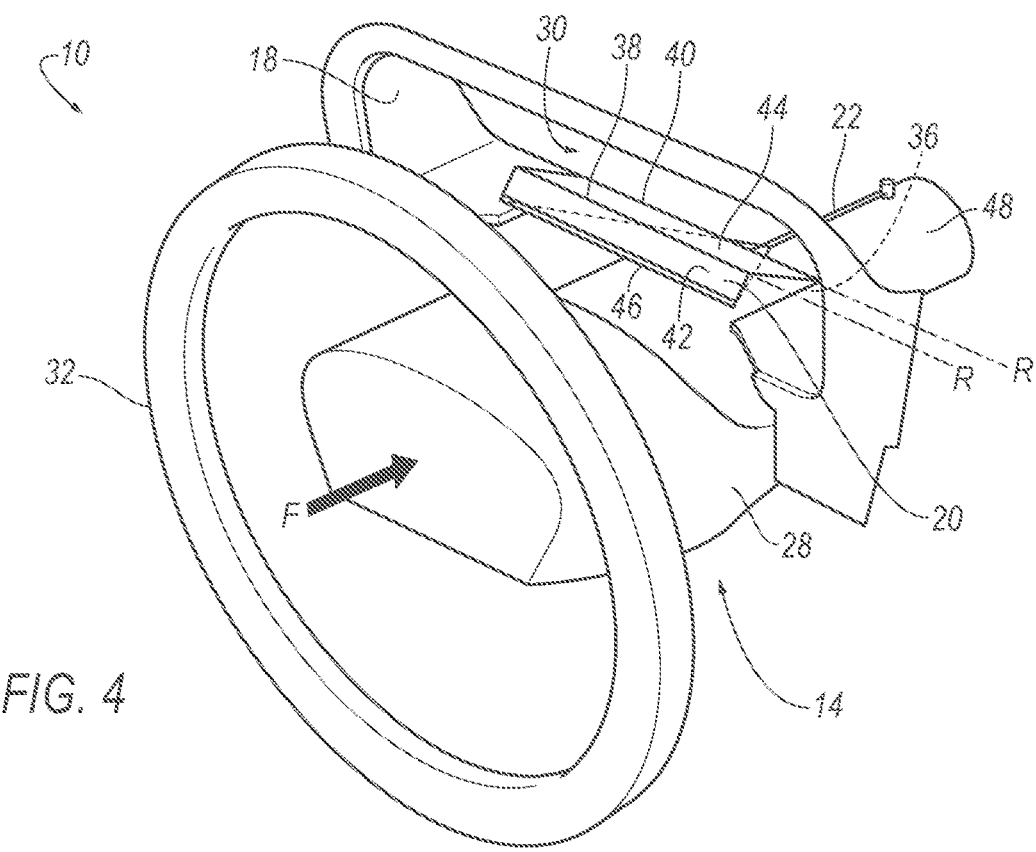
FIG. 4 is the perspective view of FIG. 3 during impact by a driver during a vehicle impact.

With continued reference to FIGS. 2-5C, the releasable panel 20 includes one or more hinges 38, 40. The hinges 38, 40 allow the releasable panel 20 to fold relative to the bezel 18 and/or to fold relative to itself when the tear seams 34, 36 tear. The hinges 38, 40 may be, for example, a living hinge, weakened bend line, etc. The releasable panel 20 may include any suitable number of hinges, i.e., one or more. In the example shown in the Figures, the releasable panel 20 includes two hinges, i.e., a first hinge 38 and a second hinge 40. The first hinge 38 and the second hinge 40 may be concealed from view (as shown in FIG. 2) prior to deformation of the steering column 14.

In the example shown in the Figures, the first hinge 38 is in the releasable panel 20 to allow the releasable panel 20 to rotate relative to itself and the second hinge 40 connects the releasable panel 20 to the bezel 18 to allow the releasable panel 20 to rotate relative to the bezel 18.

The first hinge 38 and the second hinge 40 each have a rotational axis R. The rotational axes R may be generally parallel to each other. Specifically, the rotational axes R allow the releasable panel 20 to fold about the rotational axes R to deform and bunch together and may deviate slightly from parallel due to manufacturing deviations, packaging constraints, etc. The rotational axes R may be elongated in a generally cross-vehicle direction.

In the example in which the rotational axes R are elongated in the generally cross-vehicle direction and the first tear seam 34 and second tear seam 36 are elongated in the generally vehicle-longitudinal direction, the rotational axes R are transverse to the first tear seam 34 and the second tear seam 36. Specifically, the rotational axes R may be generally perpendicular to the first tear seam 34 and the second tear seam 36, as shown in the Figures. Specifically, the first hinge 38 and the second hinge 40 may be generally perpendicular to the first tear seam 34 and the second tear seam 36. In the example shown in the Figures, the rotational axes R extend through the first tear seam 34 and the second tear seam 36. Specifically, the hinges may extend to the first tear seam 34 and to the second tear seam 36. As other examples, one or more hinges 38, 40 may be offset from one or more of the tear seams 34, 36 in the vehicle-longitudinal direction and/or one or more hinges 38, 40 may be spaced from one or more of the tear seams in the cross-vehicle direction.

The releasable panel 20 may have multiple panels connected by hinges and/or tear seams. In the example shown in the Figures, the releasable panel 20 includes two panels, and in other examples, the releasable panel 20 may including any suitable number of panels, i.e., one or more. Specifically, with reference to FIGS. 5A-C, the releasable panel 20 shown in the Figures includes a distal panel 42 and a proximate panel 44 between the bezel 18 and the distal panel 42. In such an example, the first hinge 38 connects the distal panel 42 and the proximate panel 44 and the second hinge 40 connects the proximate panel 44 to the bezel 18. As shown in FIGS. 5A-C, the distal panel 42 and the proximate panel 44 are rigid relative to the hinges 38, 40 and the tear seams 34, 36 so that the distal panel 42 and the proximate panel 44 generally maintain shape as the releasable panel 20 releases from the bezel 18.

The releasable panel 20 has a class-A surface 50 at the free edge 46. A class-A surface is a finished surface exposed to view by a customer and free of unaesthetic blemishes and defects. The distal panel 42 can include the class-A 50 surface at the free edge 46. The releasable panel 20 and the bezel 18 may be unitary, i.e., formed together simultaneously as a single continuous unit, e.g., by injection molding. Non-unitary components, in contrast, are formed separately and subsequently assembled, e.g., by, welding, adhesive, etc. The tear seams 34, 36, and/or the hinges 38, 40 may be unitary with the releasable panel 20 and the bezel 18, i.e., formed during the formation of the releasable panel 20 and the bezel 18.

The releasable panel 20 includes a free edge 46. Specifically, the distal panel 42 may include a free edge 46 spaced from the second hinge 40. The free edge 46 may extend from one portion of the bezel 18 to another portion of the bezel 18. The free edge 46 is free, i.e., cantilevered, in that the free edge 46 is supported only by the bezel 18 and is unsupported vehicle-rearward of the bezel 18. The first tear seam 34 and the second tear seam 36 extend along the distal panel 42 and the proximate panel.

The first hinge 38 and the second hinge 40 are between the free edge 46 and the bezel 18. The specifically, the first hinge 38 and the second hinge 40 may be between the cable 22 and the bezel 18. Accordingly, the cable 22 urges the first hinge 38 and the second hinge 40 to bend when the steering column 14 deforms.

With reference to FIGS. 5A-C, the cable 22 is connected to the distal panel 42. Specifically, the cable 22 may be connected to the distal end. The cable 22 may be concealed from view, e.g., may be concealed between a decorative surface, panel, etc., and the releasable panel 20.

The cable 22 may be releasably connected to one of the releasable panel 20 and the steering column 14 to release the steering column 14 from the releasable panel 20 after the steering column 14 when tensile load on the cable 22 exceeds a predetermined level, e.g., between 225-275N. Specifically, vehicle-forward movement of the steering column 14 relative to the instrument panel 16 against the resistance of the releasable panel 20 increases the tensile load on the cable 22. For example, after the tear seams break away, the forces resulting from pulling on the hinge increases the tensile load on the cable 22. In other words, the tensile load may exceed the predetermined level after the steering column 14 has moved a predetermined distance in the vehicle-forward direction relative to the instrument panel 16. The cable 22 may be designed to release from one of the releasable panel 20 and the steering column 14 after the steering column 14 has moved a predetermined distance in the vehicle-forward direction relative to the instrument panel 16. In the example shown in FIG. 5C, the cable 22 releases from the steering column 14. As an example, the cable 22 may be tack welded to the steering column 14 with the tack weld being designed to release from the steering column when the tensile load on the cable 22 exceeds the predetermined level.

With reference to FIGS. 1-4, the releasable panel 20 is between the gauge cluster 30 and the steering column 14. Specifically, the releasable panel 20 is below the gauge cluster 30. The cable 22 is below the releasable panel 20. The steering column 14 is below the cable 22. The releasable panel 20 has a class-A surface facing the gauge cluster 30. releasable panel 20 may be the lower class-a surface.

A progression of the movement of the steering column 14 relative to the instrument panel 16 is shown in FIGS. 5A-C. With reference to FIG. 5A, in operation, the cable 22 extends from the steering column 14 to the releasable panel 20 prior to deformation of the steering column 14 relative to the instrument panel 16. As shown in FIG. 5A, the cable 22 includes slack that allows for fore-aft adjustment and/or tilt adjustment of the steering column 14 relative to the instrument panel 16 by the driver, as described above. In the event of a vehicle impact that urges the driver into the steering column 14 (as identified with force arrow F), the steering column 14 deforms and moves vehicle-forward relative to the instrument panel 16. During this movement, the cable 22 is tightened and exerts force on the releasable panel 20, causing the releasable panel 20 to release from the bezel 18 at the first tear seam 34 and the second tear seam 36 and causing the releasable panel 20 to rotate at the first hinge 38 and the second hinge 40. The break away of the first tear seam 34 and the second tear seam 36 and the rotation at the first hinge 38 and the second hinge 40 absorbs energy and provides resistance against movement of the steering column 14 in the vehicle-forward direction. As the steering column 14 continues to move relative to the instrument panel 16, tensile force in the cable 22 exceeds the predetermined threshold and releases from the steering column 14 and/or the panel (release from the steering column 14 is shown in FIG. 5C), allowing the steering column 14 to continue movement in the vehicle-forward direction.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The adjectives "first" and "second" are used as identifiers and not to signify order or importance.

The invention claimed is:

1. An assembly comprising:
   a steering column;
   an instrument panel;
   a bezel fixed to the instrument panel;
   a releasable panel releasably connected to the bezel;
   a cable extending from the releasable panel to the steering column; and
   a tear seam between the releasable panel and the bezel.

2. The assembly of claim 1, wherein the tear seam is a first tear seam between the bezel and the releasable panel and a second tear seam is between the bezel and the releasable panel, the first tear seam and the second tear seam being spaced from each other.

3. The assembly of claim 2, wherein the releasable panel includes a hinge having a rotational axis extending through the first tear seam and the second tear seam, the hinge being between the cable and the bezel.

4. The assembly of claim 3, further comprising a second hinge, the second hinge being between the hinge and the bezel.

5. The assembly of claim 3, wherein the releasable panel has a free edge, the hinge being between the free edge and the bezel.

6. The assembly of claim 5, wherein the releasable panel has a class-A surface at the free edge.

7. The assembly of claim 3, wherein the hinge is elongated in a generally cross-vehicle direction and the first tear seam and the second tear seam are elongated in generally vehicle-longitudinal directions.

8. The assembly of claim 2, wherein the releasable panel is elongated from the first tear seam to the second tear seam.

9. The assembly of claim 1, wherein the tear seam is designed to break in response to impact of the steering column by an occupant during a frontal vehicle impact.

10. The assembly as set forth in claim 1, further comprising a gauge cluster supported by the instrument panel, the releasable panel being between the gauge cluster and the steering column.

11. The assembly of claim 10, wherein the releasable panel is below the gauge cluster, the cable is below the releasable panel, and the steering column is below the cable.

12. The assembly of claim 10, wherein the releasable panel has a class-A surface facing the gauge cluster.

13. The assembly of claim 1, wherein the cable is designed to release from at least one of the releasable panel and the steering column when tensile load on the cable exceeds between 225-275N.

14. The assembly of claim 1,
   wherein the releasable panel includes a distal panel and a proximate panel between the bezel and the distal panel;
   wherein the cable is connected to the distal panel;
   further comprising a first hinge connecting the distal panel and the proximate panel;
   further comprising a second hinge connecting the proximate panel to the bezel; and
   wherein the tear seam is a first tear seam connecting the bezel and the releasable panel and a second tear seam is connecting the bezel and the releasable panel, the first tear seam and the second tear seam being spaced from each other; and
   wherein the first tear seam and the second tear seam are elongated in directions transverse to a rotational axis of the second hinge.

15. The assembly of claim 14, wherein the first tear seam and the second tear seam extend along the distal panel and the proximate panel.

16. The assembly of claim 15, wherein the distal panel includes a free edge spaced from the second hinge.

17. The assembly of claim 16, wherein the distal panel includes a class-A surface at the free edge.

\* \* \* \* \*